April 14, 1942.  F. BARTLETT  2,279,812

PROTECTIVE COVER FOR AUTOMOBILE BODIES

Filed Jan. 27, 1940

INVENTOR
Fred Bartlett
BY
Walter P. Fuger
ATTORNEY

Patented Apr. 14, 1942

2,279,812

UNITED STATES PATENT OFFICE 2,279,812

PROTECTIVE COVER FOR AUTOMOBILE BODIES

Fred Bartlett, Buffalo, N. Y.

Application January 27, 1940, Serial No. 316,043

3 Claims. (Cl. 135—5)

This invention relates generally to improvements in covers for automobiles but more particularly to a cover designed for protecting new automobile bodies from damage during delivery or transit by motor convoys.

It has for one of its objects to provide a protecting cover of this character which is so designed and constructed as to fit firmly and snugly from the front to the rear end of the car body to effectually guard its high finish from marring and scratching by trees and other obstructions encountered along highways while being convoyed.

Another object of the invention is to provide a form-fitting cover for convoyed automobiles which is readily applicable to and removable from such vehicles and which is not liable to work loose or whip or flap in the wind during transit.

Other objects of the invention reside in the construction and arrangement of parts hereinafter described and particularly pointed out in the appended claims.

Figure 1:
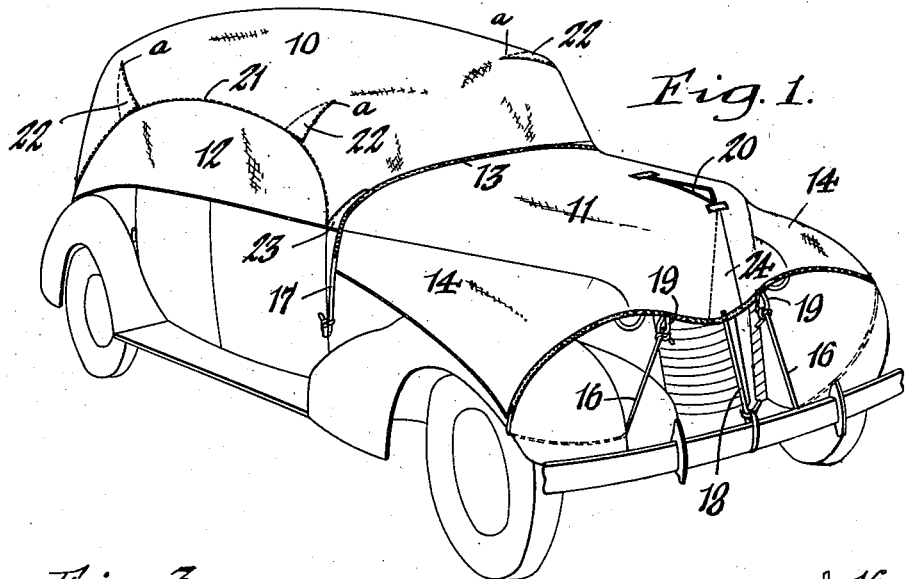
Figure 3:
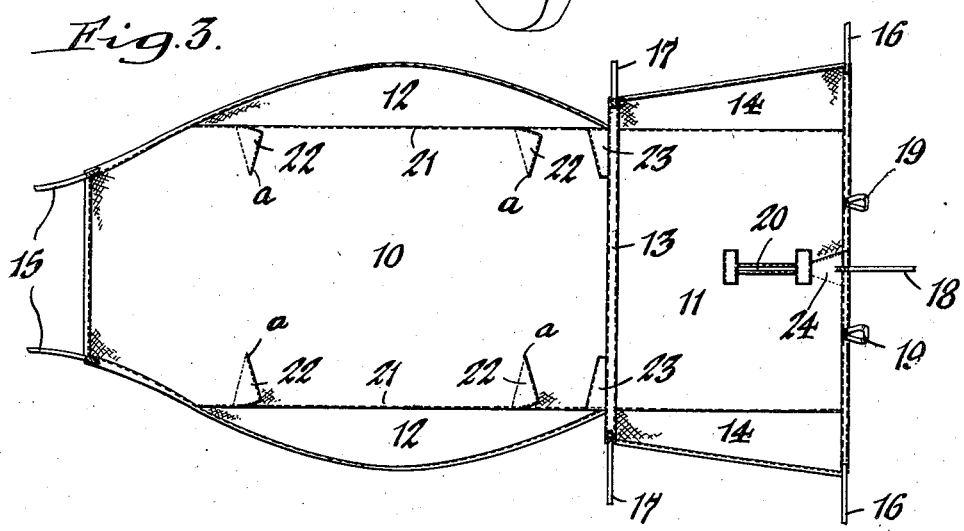
Figure 2:
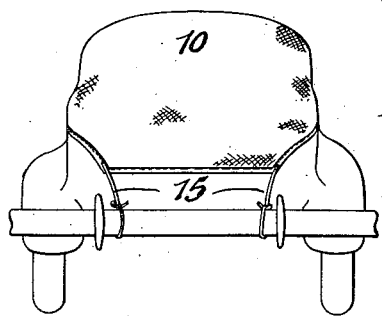

In the accompanying drawing:

Figure 1 is a perspective view of a motor vehicle showing my improved cover applied thereto. Figure 2 is a rear view thereof. Figure 3 is a plan view of the cover detached from the vehicle.

Similar characters of reference indicate corresponding parts throughout the several views.

This improved vehicle cover is so designed that it is practically universally applicable to the sedan type of cars for protecting their bodies against surface damage during delivery from the factory by convoy, which can be quickly applied to and removed from the body, and which can be repeatedly used by the operators of such convoys.

In the preferred form of the invention shown in the drawing, it consists in its finished form, shown in Figure 3, of a single piece of flexible material shaped and cut as to provide a form-fitting cover arranged to extend over the top, adjoining sides, windshield and rear end of the car body, as well as over the hood and front fenders thereof. The cover is made of a suitable weatherproof material, such as canvas lined with a soft plush material, the numeral 10 indicating the main section of the cover which extends over the top, adjoining sides, windshield and rear end of the car body, as shown in Figures 1 and 2, and 11 indicating a seam-connected auxiliary section which extends over the hood, the adjoining front portion of the radiator grille and the front fenders, as shown in Figure 1. The main section is substantially rectangular in shape and seam-connected to the opposite side edges thereof are side wings or panels 12, 12 which are shaped to extend over the side portions of the car body, their outer hemmed edges being convexly curved in plan, as shown in Figure 3, and blending into the side edges of the rear converging extension of the main portion, whereby to snugly fit the curved design of the car body. The front or hood section 11 of the cover is secured by stitching or otherwise to the front edge of the main or body section 10, the resulting reinforcing or joining strip 13 extending transversely between such sections and engaging the car-body at substantially the junction between the lower portion of the windshield-frame and the rear portion of the hood. The central portion of the front section 11 is of such dimensions as to extend completely over the top side of the hood of the car and the adjoining upper front portion of the radiator grille, while attached to the side edges thereof are side wings or panels 14, 14 whose hemmed edges diverge forwardly from the opposite sides of the adjoining strip 13 to span and extend over the front fenders of the vehicle in the manner shown in Figure 1.

The means for detachably securing the cover to the car-body preferably consists of a plurality of tie members or tapes 15, 16, 17 and 18 which are secured to the cover and are adapted to be tied to various adjoining parts of the vehicle-body. The rear tapes 15 which extend from the main section 10 of the cover are adapted to be secured to the rear bumper of the car, as shown in Figure 2, whereby the rear portion of the cover is drawn snugly about the sides and rear end of the vehicle body. The tapes 16 and 17, which are associated with the hood-section 11, are adapted to be wrapped about the front fenders of the vehicle and to the lower hinge brackets of the front doors of the vehicle, respectively, as clearly shown in Figure 1. The fender-engaging tapes 16 are adapted to be engaged and tied to companion loops 19 pending from the front edge of the hood-section adjoining the radiator grille of the car, whereby this section of the cover is firmly drawn over the hood and fenders in snug-like fashion. The front attaching tape 18, which extends from the center of the hood-section of the cover, is adapted to be wrapped around and tied to the front fender of the car.

For the purpose of accommodating the usual ornaments applied to the front portion of the vehicle-hood, I provide a longitudinal slit 20 in the hood section which is of sufficient length to enable it to accommodate various forms of hood ornament on the different makes of cars. In this connection the tape-engaging loops 19 readily adapt themselves to receive the companion tapes 16 irrespective of the length of the hood on a given car-body.

The main section 10 of the cover is so cut and constructed inwardly of the seams 21 connecting the side panels thereto as to provide a snug, form-fit with the car-body and thereby prevent a flapping of this portion of the cover by the wind during transit of the car by convoy. To this end, as shown in Figure 3, this section of the cover is cut adjacent its front and rear ends at the points a and then overlapped in substantially triangular fashion to provide darts 22, thereby contracting the cover material at those points which overlie the defined curved portions of the car-body, namely, those top portions adjacent the windshield and rear end of the car. In this connection it is to be understood that these slits or cuts are made and the material overlapped before the adjoining side panels 12 are stitched in place. At the junction between the main section 10 and hood-section 11 of the cover and particularly at that point where the said section 10 extends over the opposite arched sides of the car-body at the base of the windshield, such section is provided with inserts or gores 23 which give added fullness to the cover at these locations and provide the smooth snug fit desired at those points.

The central front portion of the hood-section 11 of the cover is preferably likewise provided with an inwardly-extending cut or slit resulting in a triangular-shaped dart 24 which affords a smooth, contour-like fit across the girdle of the radiator.

While manifestly simple and inexpensive in construction, this improved cover affords maximum protection against marring and scratching from trees and other protuberances with which new cars, while being convoyed, are liable to contact during transit, and its form-fitting structure assures an overall smooth, snug fit of the cover to the car body and eliminates any whipping or flapping in the wind, thereby assuring firm anchorage of the cover to the car-body at all times.

I claim as my invention:

1. A sheet-like covering of flexible material adapted to be stretched tightly over an automobile, comprising a body covering section and an adjoining hood covering section, said body covering section comprising a middle panel with darts in its side edges to make it conform to the shape of an automobile body and having laterally disposed side panels with convexly curved lateral contours, attached to said side edges, said hood covering section having divergent lateral edges, and flexible tie members attached to the said sections for snugly holding the said covering to an automobile.

2. A sheet-like covering of flexible material adapted to be stretched tightly over an automobile, comprising a body covering section including a middle panel with darts in its side edges to make it conform to the shaping of an automobile body and having laterally disposed side panels with convexly curved lateral contours attached to said side edges, and flexible tie members attached to the covering for snugly holding it to an automobile.

3. A sheet-like covering of flexible material adapted to be stretched tightly over an automobile, comprising a body covering section including a middle panel adapted to extend over the top of the automobile body and the windshield thereof and laterally-disposed side panels with substantially convexly-curved lateral contours adapted to extend over the adjoining sides of the automobile body, darts in said body adjoining the contiguous portions of said middle and side panels for shaping the same snugly to the contour of said body, and flexible tie members attached to said covering for snugly holding it to an automobile body.

FRED BARTLETT.